(12) United States Patent
Koller et al.

(10) Patent No.: US 9,683,525 B2
(45) Date of Patent: Jun. 20, 2017

(54) CANISTER PURGE VALVE SYSTEM

(71) Applicant: Ford Global Technologies, LLC, Dearborn, MI (US)

(72) Inventors: Keith Scott Koller, Grosse Ile, MI (US); Kevin William Plymale, Canton, MI (US); Dennis Seung-Man Yang, Canton, MI (US); Michael Wene, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 14/483,853

(22) Filed: Sep. 11, 2014

(65) Prior Publication Data

US 2016/0076493 A1    Mar. 17, 2016

(51) Int. Cl.
    *F02M 25/08*      (2006.01)
    *F16K 31/06*      (2006.01)
    *F02D 41/00*      (2006.01)

(52) U.S. Cl.
    CPC .... *F02M 25/0836* (2013.01); *F02M 25/0809* (2013.01); *F16K 31/0672* (2013.01); *F02D 41/0042* (2013.01); *F02D 2200/0602* (2013.01); *F02M 2025/0845* (2013.01)

(58) Field of Classification Search
    CPC ............. F02M 25/0836; F02M 23/006; F02M 23/0221; F02M 2025/0845; F02M 25/0809; F16K 31/44; F16K 31/041; F16K 31/105; F16K 31/0672
    See application file for complete search history.

(56) References Cited

U.S. PATENT DOCUMENTS

| | | | |
|---|---|---|---|
| 3,800,817 A | 4/1974 | Gropp et al. | |
| 4,326,489 A | 4/1982 | Heitert | |
| 5,971,889 A | 10/1999 | Ohashi et al. | |
| 6,832,595 B2 | 12/2004 | Klein et al. | |
| 7,128,084 B2 | 10/2006 | Long et al. | |
| 7,182,072 B1 | 2/2007 | Clemens | |
| 7,607,638 B2 | 10/2009 | Wilson et al. | |
| 2003/0042452 A1* | 3/2003 | Burke | F02M 25/0836 251/129.15 |
| 2008/0000456 A1 | 1/2008 | Modien | |

OTHER PUBLICATIONS

Anonymous, "Redundant Seal on the Armature Assembly in the Canister Purge Valve," IPCOM No. 000238914, Published Sep. 24, 2014, 2 pages.

* cited by examiner

*Primary Examiner* — Jacob Amick
(74) *Attorney, Agent, or Firm* — James Dottavio; McCoy Russell LLP

(57) ABSTRACT

Systems and methods are described for a canister purge valve. A method comprises rotating an armature within a valve body in the canister purge valve as the canister purge valve opens and closes during a purge operation. The armature is encircled at a first end by an elastomer seal with multiple angled wings that enable rotation of the armature about a central longitudinal axis during the purge operation.

19 Claims, 10 Drawing Sheets

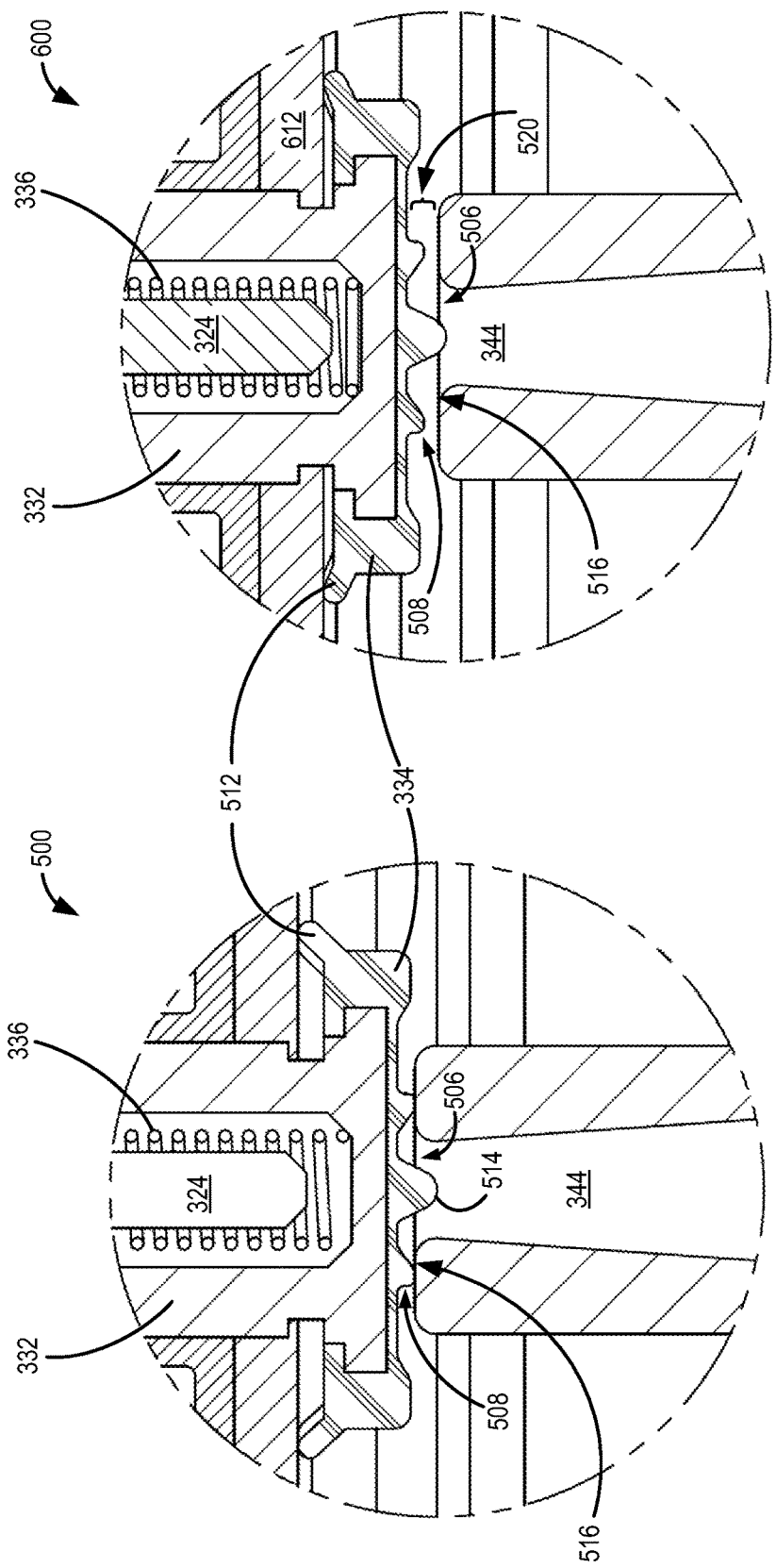

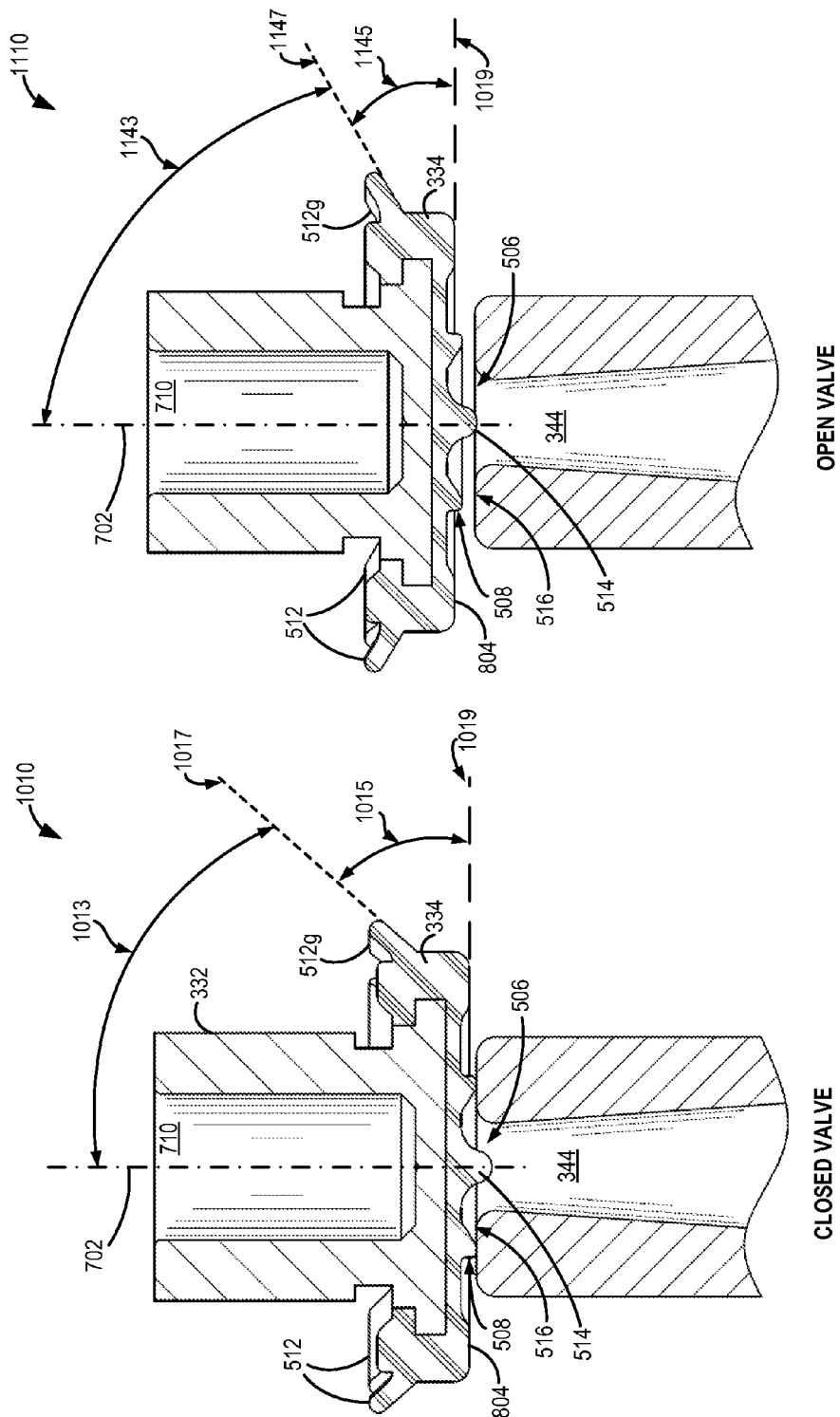

CANISTER PURGE VALVE SYSTEM

TECHNICAL FIELD

The present application relates to a canister purge valve in a fuel system of a vehicle.

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

Purging vapors from the fuel vapor canister may involve opening a canister purge valve coupled to a conduit between the fuel vapor canister and the intake manifold. Over the course of vehicle operation, the canister purge valve may entrap contaminants or other debris originating from components of the fuel system. These contaminants may be trapped on a seal in the canister purge valve and may prevent the canister purge valve from closing completely. These contaminants may be more likely to become entrapped in hybrid vehicles where the internal combustion engine, and accordingly, the purge valve may be inoperative for longer periods of time. A diagnostic routine performed to test the emission control system may detect the presence of a leak in the system if the seal in the canister purge valve cannot close completely due to the presence of contaminants. The inventors herein have recognized that reducing the trapping of contaminants on the seal may reduce a likelihood of such contaminant-sourced leaks.

Thus, in one example, a method for operating a purge valve coupled to a fuel vapor canister, having a valve body including an armature engaging and disengaging with the valve body, is provided. The method comprises opening and closing the valve body via the armature to selectively enable purge flow during a purge operation of the fuel vapor canister, and ratcheting the armature with each actuation of the valve body to rotate the armature about a central longitudinal axis. By rotating the armature, contaminants trapped on a seal attached to an end of the armature may be dislodged so that the valve can fully seal.

In another example, a method is provided for a canister purge valve comprising rotating an armature within a valve body as the canister purge valve opens and closes during a canister purge operation, the armature encircled at a first end by an elastomer seal with multiple angled wings. The multiple angled wings on the elastomer seal may enable a gradual rotation of the armature which may help clear trapped contaminants.

For example, a canister purge valve in a fuel system of a vehicle may comprise a valve body including a stator assembly and an armature-seal assembly. Herein the canister purge valve may be a solenoid valve and the vehicle may be a hybrid electric vehicle (HEV). The stator assembly may include a stator surrounded by a coil coupled to a power source. The armature-seal assembly may comprise an armature wherein a first end of the armature is surrounded substantially by an elastomer seal, and the elastomer seal may obstruct an aperture within the valve body. Further, the elastomer seal may be configured with a plurality of wings around its circumference. The aperture within the valve body may enable communication of the valve body, and thereby, a fuel vapor canister, with an intake manifold of an engine. The aperture may be normally closed by the elastomer seal when the stator assembly is de-energized. When canister purge operation is enabled, a pulse width modulated signal may be communicated to the solenoid valve. The stator assembly may be energized and as a result, the armature along with the elastomer seal may be pulled away from the aperture on the valve body allowing fluidic communication between the intake manifold and the fuel vapor canister. As the valve is pulsed and the stator assembly is energized and de-energized, wings on the circumference of the elastomer seal may vary between a stressed, flattened position and an un-stressed, inclined position, providing a gradual rotation of the armature body. As the armature-seal assembly rotates, contaminants trapped on an underside of the elastomer seal may be displaced and released into the intake via the aperture.

In this way, leaks in the canister purge valve due to contaminants may be reduced. Contaminants trapped on a surface of the seal of the armature-seal assembly in the canister purge valve may be flushed out by enabling a rotation of the armature body. Thus, a potential leak source may be mitigated and the seal may occlude the aperture fully as the stator assembly is de-energized. By reducing the likelihood of leaks resulting from the trapping of contaminants, operation of the canister purge valve may be enhanced. Further, a probability of detecting leaks in the canister purge valve during diagnostic routines may be diminished. As such, diagnostic routines may be completed without a malfunction indicator light being actuated, which may in turn prevent unnecessary and costly diagnostics and maintenance from being carried out.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 illustrates a magnified view of a valve seat within the example canister purge valve assembly of FIG. 3 when in a closed position.

FIG. 6 shows a magnified view of a valve seat within the example canister purge valve assembly (of FIG. 4) when in an open position.

FIGS. 10 and 11 present sectional views of the example armature-seal assembly of FIG. 7 in a closed purge valve and in an open purge valve respectively, according to the present disclosure.

FIGS. 3-12 are drawn approximately to scale, although other relative dimensions may be used.

DETAILED DESCRIPTION

Figure 1:
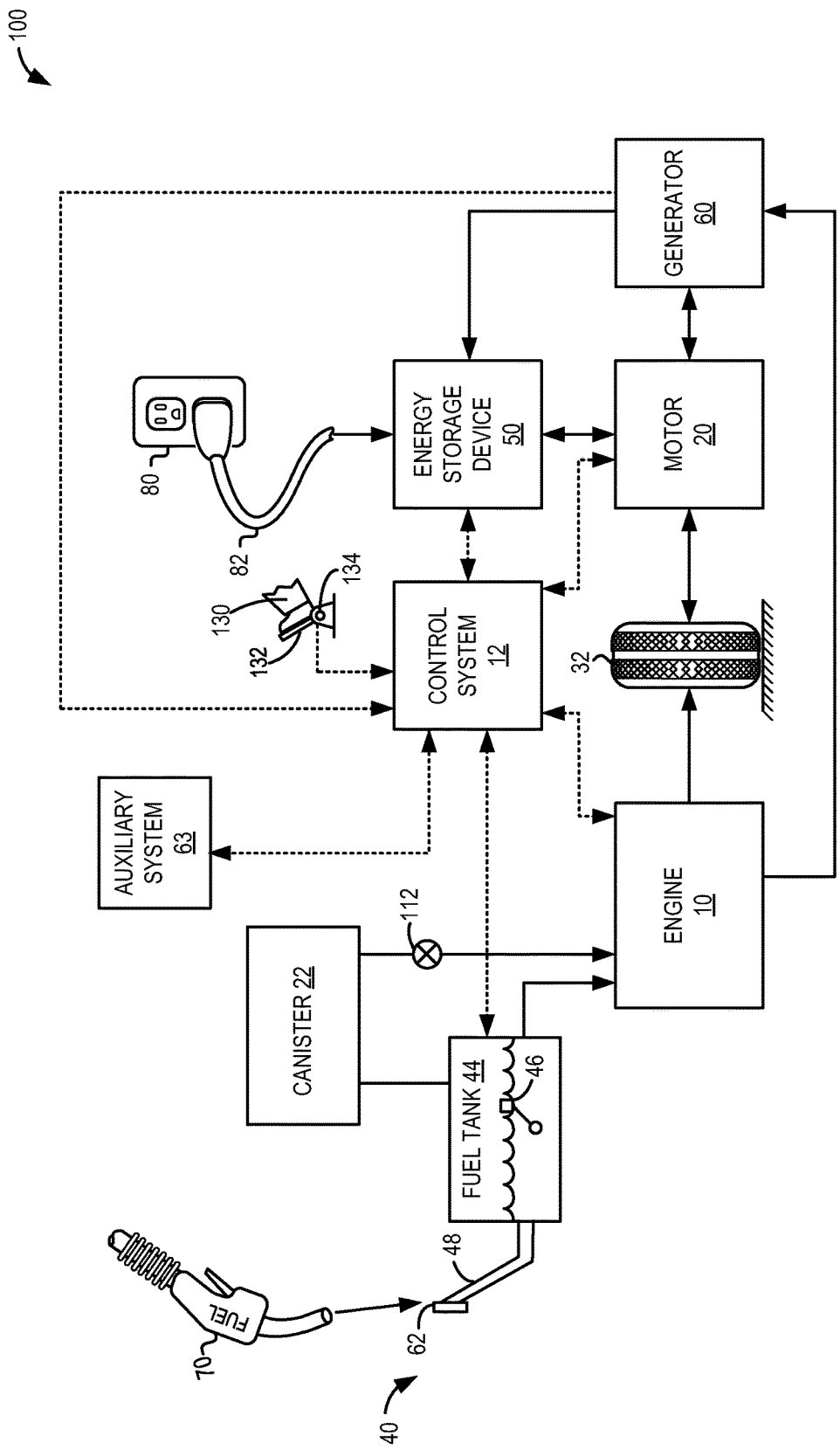
FIG. 1 shows an example hybrid vehicle system layout.
Figure 2:
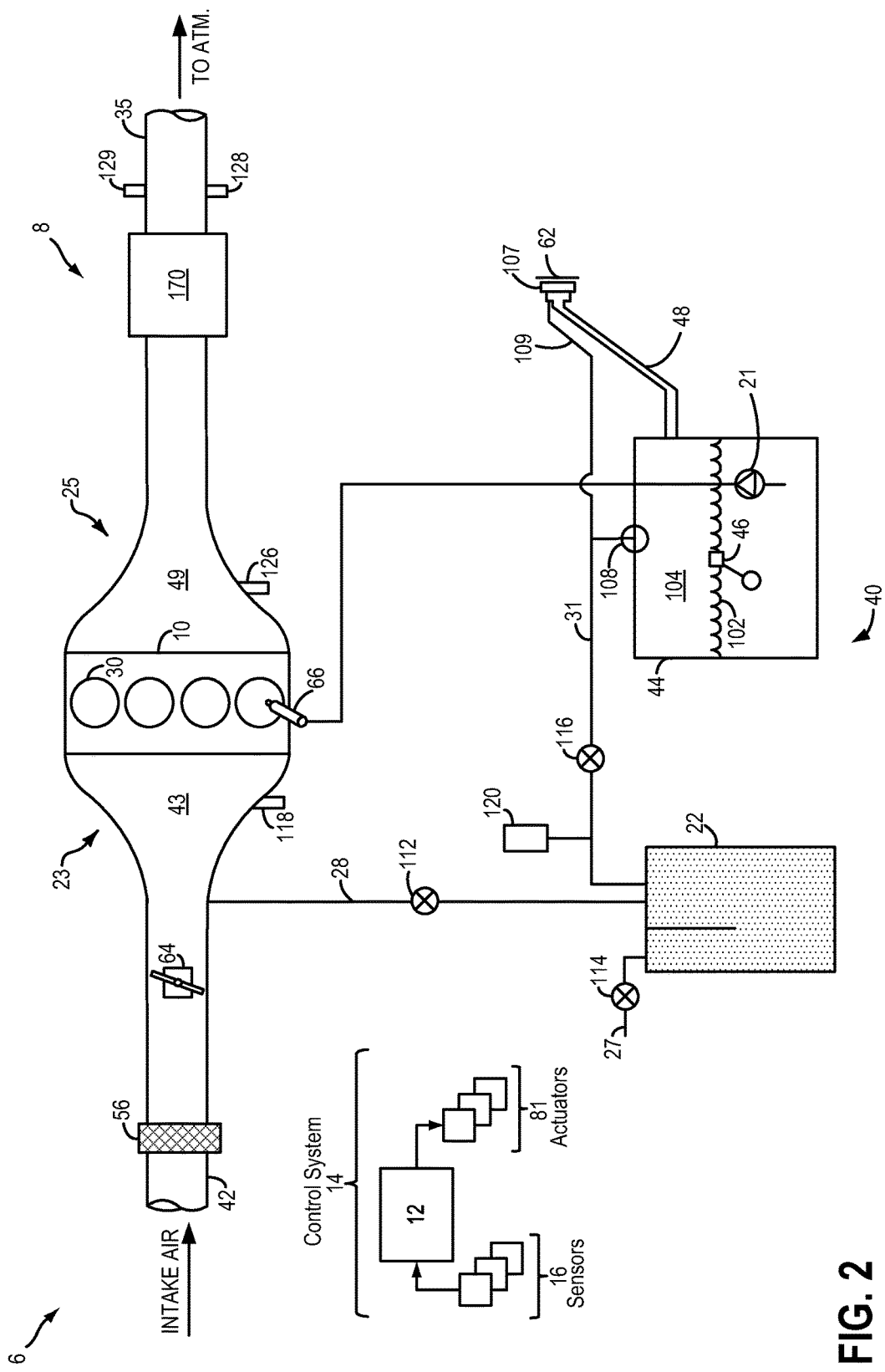
FIG. 2 depicts an example embodiment of an engine system, including a fuel system, coupled in the vehicle system of FIG. 1.
Figure 9:
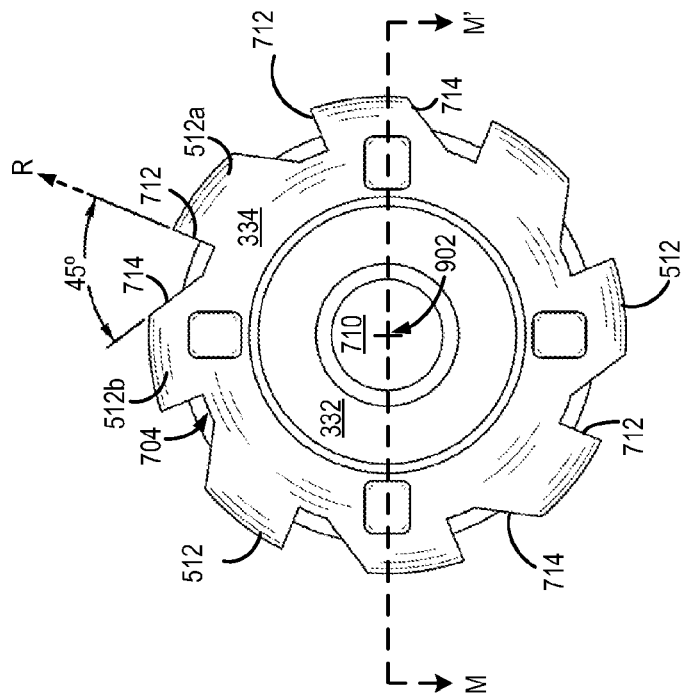
FIG. 9 presents a top view of the example armature-seal assembly of FIG. 7.

The following description relates to systems and methods for reducing leaks in a canister purge valve (CPV) that may be coupled in a fuel system of an example engine system, such as that shown in FIG. 2. The example engine system may be included in a vehicle system, such as the example hybrid vehicle system in FIG. 1. The canister purge valve may comprise a valve body and an armature-seal assembly, such as the example armature-seal assembly depicted in FIG. 7. The armature-seal assembly may engage with the valve body to open (FIGS. 4 and 6) and close (FIGS. 3 and 5) the canister purge valve. The armature-seal assembly may be configured such that an elastomer seal is attached to a first end of an armature (FIG. 8), wherein the elastomer seal may be formed with a plurality of wings around its circumference. The plurality of wings may include angled sides, wherein a first side may be perpendicular to the circumference and a second side may not be perpendicular, and may be slanted relative to the circumference (FIG. 9). Further, the plurality of wings on the elastomer seal may be stressed and flattened as the valve body opens (FIG. 11), and may return to an un-stressed position when the valve body closes (FIG. 10). This variation of the plurality of wings between stressed and un-stressed positions, along with their angled shape may cause the armature-seal assembly to slowly rotate around its central longitudinal axis (FIG. 12) during a purge operation (FIG. 13). Furthermore, rotation of the armature-seal assembly may dislodge trapped contaminants on the base of the elastomer seal enabling their purging along with desorbed fuel vapors from a vapor canister in the fuel system. These trapped contaminants may not allow the valve body to be completely sealed when the canister purge valve is deactivated and de-energized. By dislodging trapped contaminants via rotation of the armature-seal assembly, leak tests, such as that shown in FIG. 14, may not detect such contaminant-sourced leaks.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 32 while engine 10 is deactivated.

During other operating conditions, engine 10 may be deactivated while motor 20 is operated to charge energy storage device 50 via regenerative braking. Therein, motor 20 may receive wheel torque from drive wheel 32 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 32 and convert the kinetic energy of the vehicle to electrical energy for storage at energy storage device 50. Energy storage device 50 may be, for example, a system battery or set of batteries.

During still other operating conditions, engine 10 may be operated by combusting fuel received from fuel system 40. For example, engine 10 may be operated to propel the vehicle via drive wheel 32 while motor 20 is deactivated. During other operating conditions, both engine 10 and motor 20 may each be operated to propel the vehicle via drive wheel 32. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 32. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator, for example, via a fuel gauge or indication lamp (not shown) on a dashboard of the vehicle system.

Vehicle propulsion system 100 may include a fuel door 62 located on an outer body of the vehicle for receiving fuel from an external fuel source. Fuel door 62 may be held locked during most vehicle operating conditions so as to contain fuel tank vapors and reduce the release of fuel tank hydrocarbons into the environment. Fuel system 40 may periodically receive fuel from the external fuel source. However, since engine 10 is periodically set to a deactivated state (or engine-off mode) where the consumption of fuel at the engine is significantly reduced or discontinued, long durations may elapse between subsequent fuel tank refilling events. During fuel tank refilling, fuel may be pumped into the fuel tank from fuel dispensing device 70 via a refueling line 48 that forms a passageway from fuel door 62.

Fuel vapors generated in fuel tank 44 due to diurnal events and refueling events may be directed to and stored in fuel vapor canister 22 (or canister 22). The canister may include an adsorbent for storing the received fuel vapors. During selected engine operating conditions, fuel vapors may be desorbed from the canister and released into an engine intake for purging. A canister purge valve 112 may be opened when conditions are met for a purging operation.

Vehicle propulsion system 100 may include an auxiliary system 63. The auxiliary system may be, for example, a vehicle navigation system (such as a GPS), or an entertainment system (e.g., radio, DVD player, stereo system, etc.). In one example, where auxiliary system is a vehicle navigation system, location and time data may be transmitted between the control system 12 of the vehicle and a global positioning satellite via wireless communication.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

FIG. 2 shows a schematic depiction of an engine system 8 coupled in a hybrid vehicle system 6. In one example, hybrid vehicle system 6 may be configured as vehicle propulsion system 100 of FIG. 1. As such, vehicle and engine components previously introduced in FIG. 1 are numbered similarly in FIG. 2 and not reintroduced.

Engine system 8 may include an engine 10 (such as engine 10 of FIG. 1) having a plurality of cylinders 30. Engine 10 includes an engine intake 23 and an engine exhaust 25. Engine intake 23 includes an air intake throttle 64 fluidly coupled to the engine intake manifold 43. Air may enter intake passage 42 and flow through air filter 56. Engine exhaust 25 includes an exhaust manifold 49 leading to an exhaust passage 35 that routes exhaust gas to the atmosphere. Engine exhaust 25 may include one or more emission control devices 170 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown), having an intake compressor driven by an exhaust turbine.

Engine system 8 is coupled to fuel system 40. Fuel system 40 includes a fuel tank 44 coupled to a fuel pump 21 and a fuel vapor canister 22. Fuel tank 44 receives fuel via a refueling line 48, which acts as a passageway between the fuel tank 44 and a refueling door 62 on an outer body of the vehicle. During a fuel tank refueling event, fuel may be pumped into the vehicle from an external source through refueling inlet 107 which is normally covered by a gas cap. During a refueling event, while fuel is pumped into fuel tank 44, one or more fuel tank vent valves may be opened to allow refueling vapors to be directed to, and stored in, fuel vapor canister 22.

Vapors generated in fuel tank 44 may be routed to fuel vapor canister 22, via conduit 31, before being purged to engine intake 23. Fuel tank 44 may include one or more vent valves for venting diurnals and refueling vapors generated in the fuel tank to fuel vapor canister 22. The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). In the depicted example, fuel tank 44 includes a passive fuel level vent valve (FLVV) 108 that includes a float mechanism which, when displaced by fuel, shuts off the vapor flow between the fuel tank and the canister. Thus, based on a fuel level 102 relative to vapor space 104 in the fuel tank, the vent valve may be open or closed. For example, FLVV 108 may be normally open allowing fuel tank overfilling to be prevented. During fuel tank refilling, when a fuel level 102 is raised, FLVV 108 may close, causing pressure to build in vapor line 109 (which is downstream of refueling inlet 107 and coupled thereon to conduit 31) as well as at a filler nozzle coupled to the fuel pump. The increase in pressure at the filler nozzle may then trip the refueling pump, stopping the fuel fill process automatically, and preventing overfilling.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23, specifically intake manifold 43, via purge line 28 by opening canister purge valve 112. While a single fuel vapor canister 22 is shown, it will be appreciated that fuel system 40 may include any number of canisters.

Fuel vapor canister 22 further includes a vent 27 (herein also referred to as a fresh air line) for routing gases out of the fuel vapor canister 22 to the atmosphere when storing, or trapping, fuel vapors from fuel tank 44. Vent 27 may also allow fresh air to be drawn into fuel vapor canister 22 when purging stored fuel vapors to engine intake 23 via purge line 28 and canister purge valve 112. Vent 27 may include a canister vent valve 114 to adjust a flow of air and vapors between fuel vapor canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. By closing canister vent valve 114, the fuel tank may be isolated from the atmosphere.

Fuel pump 21 may be configured to pressurize fuel delivered to the injectors of engine 10, such as example injector 66. While only a single injector 66 is shown, additional injectors may be provided for each cylinder. It will be appreciated that fuel system 40 may be a return-less fuel system, a return fuel system, or various other types of fuel system.

In some embodiments, engine 10 may be configured for selective deactivation. For example, engine 10 may be selectively deactivatable responsive to idle-stop conditions. Therein, responsive to any or all of idle-stop conditions being met, the engine may be selectively deactivated by deactivating cylinder fuel injectors. As such, idle-stop conditions may be considered met if the engine is combusting while a system battery (or energy storage device) is sufficiently charged, if auxiliary engine loads (e.g., air conditioning requests) are low, engine temperatures (intake temperature, catalyst temperature, coolant temperature, etc.) are within selected temperature ranges where further regulation is not required, and a driver requested torque or power demand is sufficiently low. In response to idle-stop conditions being met, the engine may be selectively and automatically deactivated via deactivation of fuel and spark. The engine may then start to spin to rest.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. For example, the reduced engine operation times may reduce the time available for complete canister purging. As such, if the canister is not sufficiently purged during the available engine operation times, the storage ability of the canister is reduced, and exhaust emissions may be degraded. To address this, in some embodiments, a fuel tank isolation valve (FTIV) 116 may be optionally included in conduit 31 such that fuel tank 44 is coupled to fuel vapor canister 22 via FTIV 116. When included, the isolation valve may be kept closed during engine operation so as to limit the amount of diurnal vapors directed to fuel vapor canister 22 from fuel tank 44. During refueling operations, and selected purging conditions, the isolation valve may be temporarily opened to direct fuel vapors from the fuel tank 44 to fuel vapor canister 22. By opening the valve when the fuel tank pressure is higher than a threshold (e.g., above a mechanical pressure limit of the fuel tank above which the fuel tank and other fuel system components may incur mechanical damage), the fuel tank vapors may be released into the canister and the fuel tank pressure may be maintained below pressure limits.

One or more pressure sensors 120 may be coupled to fuel system 40 for providing an estimate of a fuel system pressure. In one example, the fuel system pressure is a fuel tank pressure, wherein pressure sensor 120 is a fuel tank pressure sensor (or fuel tank pressure transducer FTPT) coupled to fuel tank 44 for estimating a fuel tank pressure or vacuum level. While the depicted example shows pressure sensor 120 coupled between fuel tank 44 and fuel vapor canister 22, in alternate embodiments, the pressure sensor may be directly coupled to fuel tank 44.

Fuel vapors released from fuel vapor canister 22 during a purging operation may be directed into engine intake manifold 43 via purge line 28. The flow of vapors along purge line 28 may be regulated by canister purge valve 112, coupled between the fuel vapor canister 22 and the engine intake 23. The quantity and rate of vapors released by the canister purge valve may be determined by the duty cycle of an associated canister purge valve solenoid (not shown in FIG. 2). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 118 coupled to intake manifold 43 and communicated with controller 12. Alternatively, MAP may be inferred from alternate engine operating conditions, such as mass air flow (MAF), as measured by a MAF sensor (not shown) coupled to the intake manifold.

Fuel system 40 may be operated by controller 12 in a plurality of modes by selective adjustment of the various valves and solenoids. For example, the fuel system may be operated in a fuel vapor storage mode wherein the controller 12 may close canister purge valve (CPV) 112 and open canister vent valve (CVV) 114 and FTIV 116 to direct refueling and diurnal vapors into fuel vapor canister 22 while preventing fuel vapors from being directed into the intake manifold 43.

As another example, the fuel system may be operated in a refueling mode (e.g., when fuel tank refueling is requested by a vehicle operator), wherein the controller 12 may adjust the valves to depressurize the fuel tank before enabling fuel to be added therein. Therein the controller 12 may close CVV 114 and open each of CPV 112 and FTIV 116 to direct excess fuel tank pressure/vacuum into the intake manifold via the fuel vapor canister.

As yet another example, the fuel system may be operated in a canister purging mode (e.g., after an emission control device light-off temperature has been attained and with the engine running), wherein the controller 12 may open CPV 112, CVV 114, and close FTIV 116. By closing the FTIV, the canister can be purged more efficiently during the limited engine-on time that is available in a hybrid vehicle. During this mode, vacuum generated by the intake manifold of the operating engine may be used to draw fresh air through vent 27 and through fuel vapor canister 22 to purge the stored fuel vapors into intake manifold 43. In this mode, the purged fuel vapors from the fuel vapor canister are combusted in the engine. The purging may be continued until the stored fuel vapor amount in the canister is below a threshold or until the engine is deactivated and an electric mode of vehicle operation is resumed. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the fuel vapor canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas (air/fuel ratio) sensor 126 located upstream of the emission control device, exhaust temperature sensor 128, MAP sensor 118, and exhaust pressure sensor 129. Other sensors such as additional pressure, temperature, air/fuel ratio, and composition sensors may be coupled to various locations in the vehicle system 6. As another example, the actuators may include fuel injector 66, CPV 112, CVV 114, FTIV 116, and intake throttle 64. The control system 14 may include a controller 12. The controller may receive input data from the various sensors, process the input data, and trigger the actuators in response to the processed input data based on instruction or code programmed therein corresponding to one or more routines.

Over the course of vehicle operation, contaminants may accumulate and become lodged within the evaporative emission control system (EVAP system). Contaminants may include carbon pellets or dust, plastic, nylon, polyester, silk, cardboard fibers, olefin, dirt, other fibers or small particles, or a combination thereof. In particular, contaminants may become trapped on a surface of a seal of an armature-seal assembly in the canister purge valve. These trapped contaminants may then impede the ability of the armature-seal assembly in the canister purge valve to fully seal an aperture in the canister purge valve. This may result in a leak being detected during an EVAP system leak test. As a measure to counter the trapping of contaminants, the seal of the armature-seal assembly in the canister purge valve may be formed with a plurality of angled wings. Further, during a purge operation when the canister purge valve is enabled, the plurality of wings on the seal may alternate between an un-stressed, inclined position and a stressed, flattened position. This alternation in position of the plurality of wings and their angled shapes may enable a gradual rotation of the seal-alternator assembly during the purge operation. Rotation of the seal, instead of pulsation in one place, may enable displacement of any trapped contaminants on the surface of the seal. The dislodged contaminants may then flow through and exit the canister purge valve.

Figure 3:
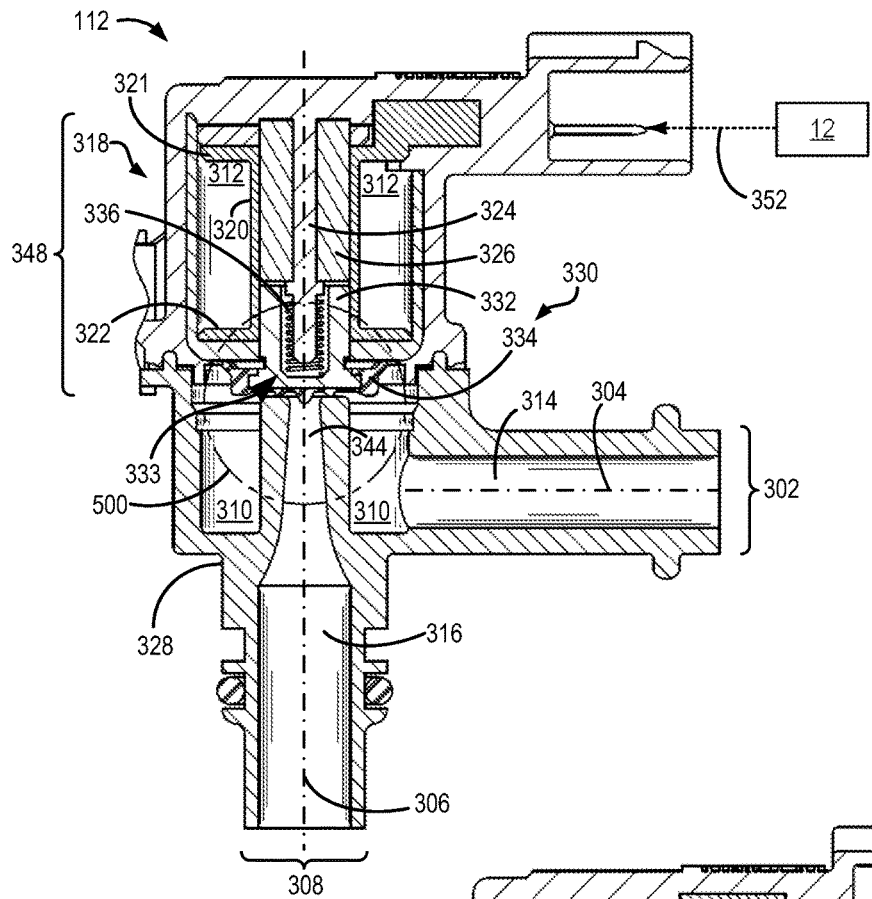
FIG. 3 portrays a sectional view of an example canister purge valve assembly in a closed position.

FIG. 3 shows an example canister purge valve 112. The canister purge valve 112 includes a valve body 328 which in turn comprises a purge valve inlet 302 (or inlet port 302) in fluidic communication with the fuel vapor canister 22, shown in FIGS. 1 and 2. The valve body 328 also includes a purge valve outlet 308 (or outlet port 308) in fluidic communication with the intake manifold 43 or other suitable intake passage included in the engine 10, shown in FIG. 2. A central axis 304 of the purge valve inlet 302 is arranged at a perpendicular angle with respect to a central axis 306 of the purge valve outlet 308. However, other relative positions of the purge valve outlet and the purge valve inlet have been contemplated. For example, the angle between the central axes may be less than or greater than 90°.

Valve body 328 further includes an actuation assembly 348. Specifically, in the depicted example, actuation assembly 348 comprises an armature-seal assembly 330 and a stator assembly 318. Accordingly, canister purge valve 112 may be a solenoid type valve which, in one embodiment, may be operated by pulse width modulation at 20 Hz. Stator assembly 318 includes an electric coil 312 wound around bobbin 320 between its top flange 321 and bottom flange 322. The electric coil 312 may be coupled to a source of electricity such as a battery in a vehicle. In the example of the hybrid vehicle system of FIG. 1, electric coil 312 may receive a supply of electricity from energy storage device 50. Stator assembly 318 further comprises a magnetically conductive stator 326 fitted into a bore within bobbin 320. Shaft 324 of valve body 328 is arranged in a central bore within stator 326 and a spring 336 encircles a first extremity of shaft 324. Spring 336 surrounding first extremity of shaft 324 is in turn positioned within a cavity (not labeled) in armature 332 of armature-seal assembly 330. An elastomer seal 334 surrounds a first end 333 of armature 332, and the elastomer seal (also termed, seal) 334 and armature 332 together form the armature-seal assembly 330. Thus, as depicted in FIG. 3, bobbin 320, stator 326, shaft 324, and armature 332 are positioned co-axially wherein each is parallel to central axis 306 of purge valve outlet 308.

Canister purge valve 112 is a normally closed valve and is depicted in FIG. 3 in its closed configuration. Herein, armature-seal assembly 330 substantially blocks an aperture (shown in FIG. 5) leading into outlet channel 344 that is in fluidic communication with outlet passage 316, which in turn leads to purge valve outlet 308. As such, when canister purge valve 112 is closed, elastomer seal 334 rests on a valve seat (indicated in FIG. 5) of valve body 328. Accordingly, fluidic communication between purge valve inlet 302, via inlet passage 314, and inlet chamber 310 is blocked from outlet channel 344, outlet passage 316, and purge valve outlet 308. In this way, seal 334 of armature-seal assembly 330 may inhibit flow from fuel vapor canister 22 when the canister purge valve 112 is in a closed configuration.

A magnified view 500 is presented in FIG. 5 portraying a magnified view of the elastomer seal 334 resting on valve seat 516 in the closed configuration. Elastomer seal 334 includes an annular lip 508 and a protuberance 514 on its underside. In the normally closed canister purge valve configuration, the annular lip 508 rests on valve seat 516 and substantially occludes aperture 506 of outlet channel 344. The aperture 506 within the valve body 328 may enable communication of the valve body, and thereby, fuel vapor canister 22, with an intake manifold 43 of engine 10 of FIG. 2).

Figure 4:
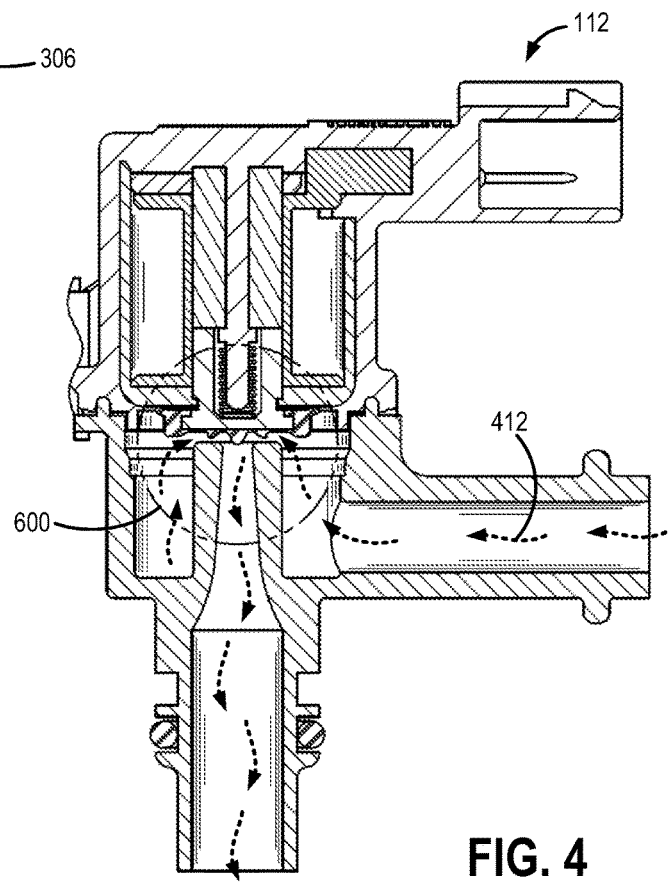
FIG. 4 presents a sectional view of the example canister purge valve assembly in an open position.

FIG. 4 illustrates the example canister purge valve 112 of FIG. 3 in an open configuration. Since FIG. 4 depicts canister purge valve 112 of FIG. 3, all components labeled and introduced in FIG. 3 are the same, and therefore, are neither labeled nor introduced herein.

When canister purge operation is enabled, controller 12 may communicate with actuation assembly 348, as shown denoted by arrow 352 in FIG. 3. Specifically, a pulse width modulated signal may be communicated to the solenoid canister purge valve 112. In response to the signal, stator assembly 318 may be energized as electricity flows through electric coil 312 magnetizing the stator 326. Consequently, armature 332 is drawn towards stator 326 and the elastomer seal 334 may be pulled away from the valve seat, opening the aperture 506 into outlet channel 344.

As the armature-seal assembly 330 lifts away from the aperture (502 of FIGS. 5 and 6), fluidic communication between purge valve inlet 302 and purge valve outlet 308 is allowed. As portrayed in FIG. 4, a mixture of desorbed fuel vapors and air (depicted as dashed arrows 412) may be drawn from fuel vapor canister through purge valve inlet 302, via inlet passage 314, into inlet chamber 310. This mixture may then flow through aperture 506 (shown in FIGS. 5 and 6) into outlet channel 344, across outlet passage 316 exiting valve body 328 through purge valve outlet 308. Thus, when valve body 328 is opened, stored fuel vapors desorbed from fuel vapor canister may be released into engine intake 23 of engine 10.

A magnified view 600 is presented in FIG. 6 portraying a magnified view of the elastomer seal 334 drawn away from valve seat 516 in the open configuration of canister purge valve 112. As shown in FIG. 6, as armature-seal assembly 330 lifts away from valve seat 516 towards stator 326 and unblocks aperture 506, a gap 520 is created between an underside surface (804 in FIG. 8) of elastomer seal 334 and valve seat 516. Mixture of desorbed vapors and air 412 entering inlet chamber 310 of valve body 328 through purge valve inlet 302 may flow through gap 520 into outlet channel 344 and thereon, through purge valve outlet 308.

It will be appreciated from 600 that as the mixture of air and fuel vapors from the fuel vapor canister 22 flow through gap 520 into aperture 506 of valve body 328, the mixture of air and fuel vapors substantially streams across the underside surface of elastomer seal 334. As such, contaminants, if present in the mixture of air and fuel vapors may get trapped on the underside surface of elastomer seal 334.

Thus, an example purge valve assembly may include a valve body with an inlet port and an outlet port and a valve seat disposed in the valve body. The valve seat may include an aperture in the path of vapor flow between the purge valve inlet port and the purge valve outlet port. Further, the purge valve assembly may include a stator assembly including a coil and a stator, the stator being magnetized when the coil is energized, and an armature that moves towards the stator away from the valve seat when the coil is energized, and moves away from the stator and towards the valve seat when the coil is de-energized.

Figure 7:
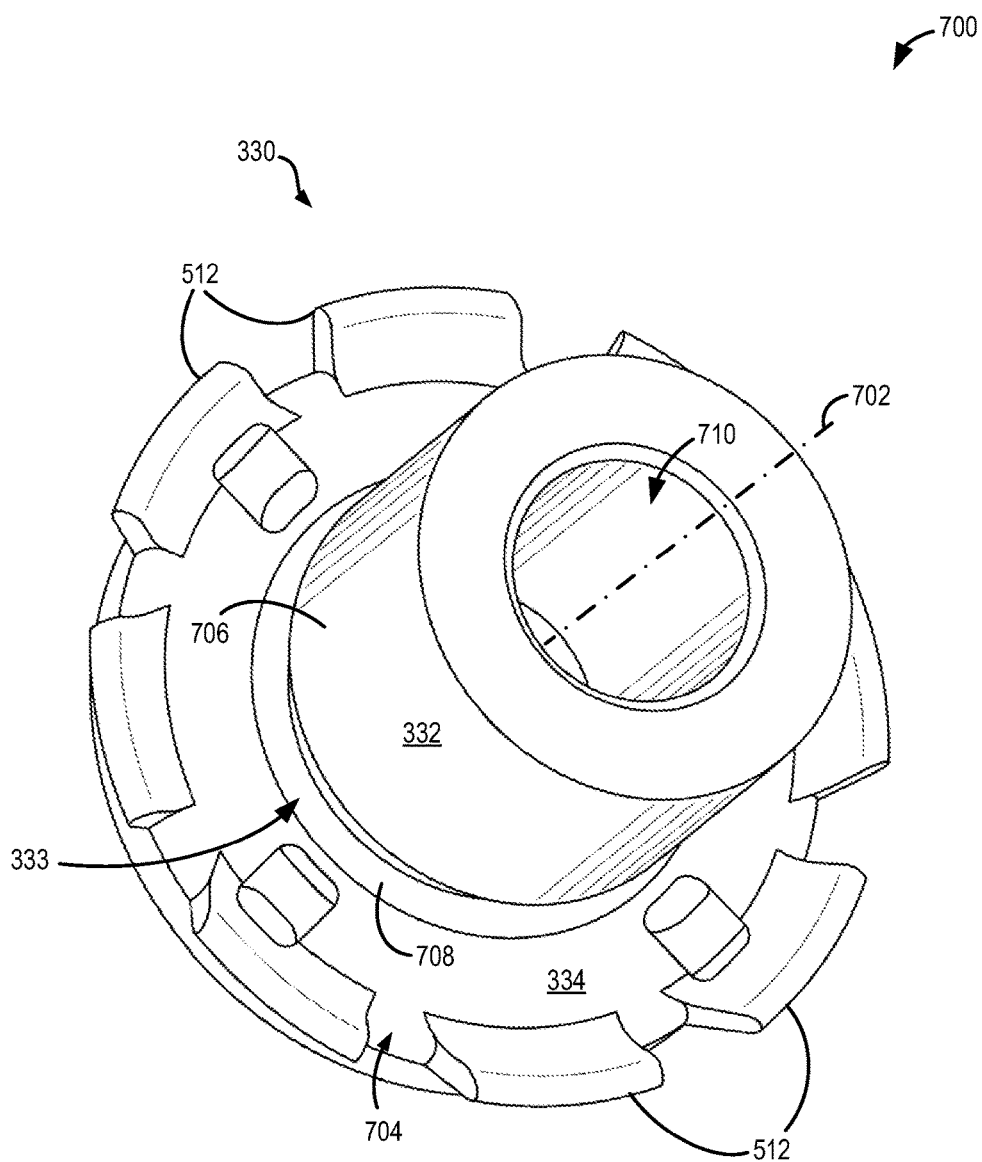
FIG. 7 depicts a perspective view of an example armature-seal assembly, according to the present disclosure.

Turning now to FIG. 7, it shows a perspective view 700 of the armature-seal assembly 330. In the depicted embodiment, armature 332 includes a hollow cylinder 706 encompassing a central cavity 710 that is sealed at its base 708. Central longitudinal axis 702 of the armature 332 may be perpendicular to base 708. In the depicted example, central longitudinal axis 702 may be the same as central axis 306 of purge valve outlet 308 shown in FIG. 3. Further, base 708 may be at the first end 333 of armature 332 and may be wider than a diameter of the hollow cylinder 706.

Central cavity 710 may accommodate spring 336 at the first extremity of shaft 324 (as shown in FIG. 3). As shown in FIG. 7, base 708 of armature 332 is substantially surrounded by elastomer seal 334. Elastomer seal 334 may be attached to base 708 of armature 332 via a variety of bonding methods. In one example, elastomer seal 334 may be joined to base 708 via adhesives. In another example, bonding between the first end 333 of armature 332 and elastomer seal 334 may be achieved during vulcanization. Other joining methods may be utilized without departing from the scope of the present disclosure. It will be noted that elastomer seal 334 may be attached to armature 332 such that it is arranged coaxially with central longitudinal axis 702. Elastomer seal 334 is formed with a plurality of wings 512 arranged around its top circumference 704.

Thus, first end 333 of armature 332 may be surrounded by elastomer seal 334, elastomer seal 334 having a plurality of wings 512 which may enable a ratcheting of armature 332 that will be explained in reference to FIG. 12.

Figure 8:
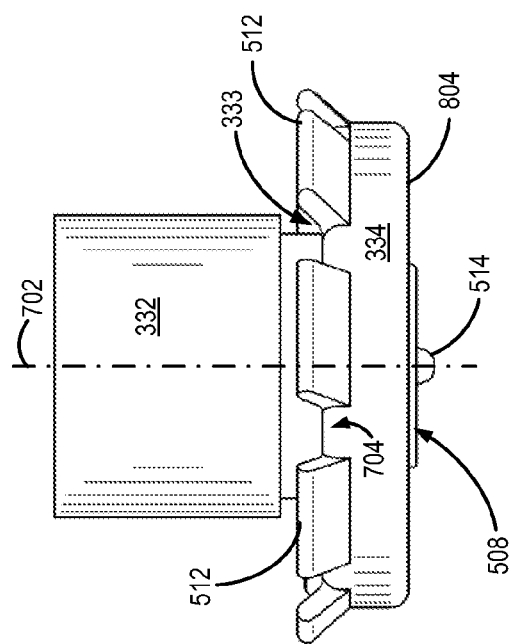
FIG. 8 depicts a front view of the example armature-seal assembly of FIG. 7.

FIGS. 8 and 9 portray an elevation view, and a top view of the armature-seal assembly 330 respectively. As described in reference to FIG. 7, the elevation view of FIG. 8 also depicts armature 332 encircled at first end 333 by elastomer seal 334. It will be observed that in the present embodiment, armature 332 and elastomer seal 334 of the armature-seal assembly 330 share a common central longitudinal axis 702. Plurality of wings 512 are formed around a top circumference 704 of the elastomer seal 334 such that the wings protrude radially from top circumference 704 of the elastomer seal 334. Further, plurality of wings 512 may be contiguous with a body of elastomer seal 334. Additionally, the plurality of wings 512 may be formed from the same elastomeric material as the elastomer seal 334. In alternate embodiments, the plurality of wings may be made from a different material and coupled to the body of the seal 334. Further still, in alternate embodiments, seal 334 may be formed from a material other than an elastomer.

FIG. 8 also includes an underside surface 804 (or base 804) of elastomer seal 334. The underside surface 804 may include annular lip 508 and protuberance 514. As mentioned earlier in reference to FIG. 6, when canister purge valve 112 is in an open configuration during a purge operation, the mixture of desorbed fuel vapors and air may stream through aperture 506 (shown in FIGS. 5 and 6) into outlet channel 344. The mixture of stored fuel vapors and air substantially flows across underside surface 804. Contaminants, such as carbon particles, dust, etc., that may be present within the mixture may impinge upon and may be trapped on the underside surface 804 of elastomer seal 334. Specifically, contaminants may be trapped along annular lip 508, in an area on underside surface 804 between annular lip 508 and protuberance 514, or other regions on underside surface 804. Further, contaminants may also settle onto valve seat 516. As such, presence of these trapped contaminant particles on the underside surface 804 (or on valve seat 516) may prevent complete sealing of aperture 506 when the canister purge valve is closed. Additionally, diagnostic routines of the evaporative emissions control system may detect such contaminant-sourced leaks and a malfunction indicator light may be actuated. Accordingly, by reducing the trapping of contaminants on the underside surface 804 of seal 334, leaks due to contaminant trapping may be diminished. In addition, more accurate estimate and control of purge vapor flow may be achieved.

A top view of the armature-seal assembly 330 indicating central cavity 710 within hollow cylinder 706 of armature 332 (described in reference to FIG. 7) is shown in FIG. 9. Elastomer seal 334 is illustrated with a plurality of wings 512 arranged in a radial manner around its top circumference 704. In the depicted embodiment, elastomer seal includes 8 wings. Other embodiments may include a different number of wings around the circumference of the elastomer seal.

Each of the plurality of wings has a first side 712 and a second side 714. First side 712 projects outward in a radial direction "R" relative to the top circumference 704. In other words, first side 712 may be approximately perpendicular relative to the top circumference 704 of elastomer seal 334. For example, first side 712 may form an angle of 95° with top circumference 704. In another example, first side 712 may form an angle of 85° with top circumference 704. In yet another example, first side 712 may be at exactly 90° relative to top circumference 704. To further elaborate, first side 712 extends in a radial direction relative to a center 902 of the elastomer seal 334.

Conversely, second side 714 of the plurality of wings 512 may not be perpendicular to top circumference 704 of elastomer seal 334. Further, first side 712 and second side 714 of a given wing, e.g. 512a, may not be parallel to each other. For example, as shown in FIG. 9, second side 714 may not project radially outwards relative to top circumference 704. As such, second side 714 may be slanted and inclined relative to top circumference 704. Specifically, second side 714 of each of the plurality of wings 512 may form an angle of 45° with first side 712 of its immediately adjacent wing. To elaborate, as shown in FIG. 9, second side 714 of wing 512b may form an angle of 45° only with first side 712 of its proximate (and adjacent) wing 512a. To elaborate further, first side 712 of wing 512a is directly adjacent to second side 714 of wing 512b. No other wing lies between wing 512a and 512b.

Thus, a second side 714 of a first wing 512b may be formed at an angle of approximately 45° relative to a first side 712 of a second wing 512a, wherein the second wing 512a may be positioned directly adjacent to the second side 714 of the first wing 512b. In other embodiments, the angle between the first side 712 of wing 512a and second side 714 of wing 512b may be distinct from that listed above.

By inclining second side 714 at a different angle relative to first side 712, instead of forming each of the first side 712 and the second side 714 to project radially outward, a rotation of the armature may be enabled. Further description of the rotation will be provided in reference to FIG. 12.

It will be appreciated that though the description above includes an example of second side 714 of a first wing being at an angle of approximately 45° relative to a first side 712 of an adjacent wing, other embodiments may include second side 714 being at a different angle (other than 45°) relative to first side 712 of the immediately adjacent wing. It will also be appreciated that second side 714 may not be perpendicular to top circumference 704.

As such, each wing of the plurality of wings 512 may include first side 712 and second side 714 at different angles relative to top circumference 704 and relative to each other. In other words, first side 712 may not be parallel to second side 714.

Changes in position of the plurality of wings 512 during a purge operation are illustrated in FIGS. 10 and 11. A closed configuration of canister purge valve 112, specifically a position of armature-seal assembly 330 occluding aperture 506 on valve seat 516 is depicted in sectional view 1010 of FIG. 10. Sectional view 1010 is a cross-sectional view of seal 334 in a cross sectional plane along line M-M' of FIG. 9. An open configuration of canister purge valve 112 portraying a position of armature-seal assembly 330 lifted away from valve seat 516 is presented in FIG. 11.

As depicted in FIG. 10, each of the plurality of wings 512 of seal 334 are formed at a certain angle relative to central longitudinal axis 702 of armature-seal assembly 330. It will be noted that the plurality of wings 512 may be in a natural, and un-stressed position when the canister purge valve 112 is closed. As an example, wing 512g on the extreme right of sectional view 1010 (as viewed by reader) may form angle 1013 relative to central longitudinal axis 702 in the closed configuration of canister purge valve 112. Specifically, line 1017 which indicates an inclination of wing 512g may be at angle 1013 relative to central longitudinal axis 702. Line 1017 may also be parallel to the inclination of wing 512g. In the present disclosure, angle 1013 may be approximately 40 degrees relative to central longitudinal axis 702. In one example, wing 512g may form a 35° angle relative to central longitudinal axis 702. In another example, wing 512g (and line 1017) may form an angle of 45° relative to central longitudinal axis 702. In yet another example, wing 512g (and line 1017) may form an angle of exactly 40 degrees relative to central longitudinal axis 702. Thus, each of the plurality of wings 512 may be approximately at an angle of 40 degrees relative to the central longitudinal axis 702 when the valve body 328 and purge valve 112 is closed, and wherein the plurality of wings 512 are in a non-stressed condition when the valve body 328 is closed.

It will be appreciated that each of the plurality of wings 512 may also be inclined relative to base 804 of elastomer seal. As an example, wing 512g may form an angle 1015 with base 804. Base 804 may be extended as line 1019 for improved clarity of the angles formed in the seal assembly. Thus, line 1019 may form an angle 1015 with wing 512g. Angle 1015 may be approximately 50 degrees relative to line 1019 when the canister purge valve is closed. In one example, angle 1015 may be 48° relative to base 804. In another example, angle 1013 may be 52° relative to base 804 (or line 1019). In yet another example, wing 512g (and line 1017) may form an angle of exactly 50 degrees relative to line 1019 (and base 804) when the canister purge valve is closed. Thus, each of the plurality of wings 512 may be inclined at an angle of approximately 50 degrees relative to base 804 of the elastomer seal 334 when the elastomer seal 334 engages the valve seat 516 and the purge valve 112 is closed.

In contrast, the plurality of wings 512 may be at a different inclination relative to central longitudinal axis 702 and base 804 in an open configuration of canister purge valve 112 as shown in view 1110 of FIG. 11. As will be observed, the plurality of wings 512 may assume a more flattened and stressed position relative to their natural, as-formed, and un-stressed position of view 1010. As such, plurality of wings 512 may impinge against a flat surface of stator assembly 318 and may be stressed and flattened when the valve body 328 is opened. To further elaborate, wing 512g may form angle 1143 relative to central longitudinal axis 702 in the open configuration of canister purge valve 112. Specifically, line 1147 which indicates an inclination of wing 512g may be at angle 1143 relative to central longitudinal axis 702. Line 1147 may also be parallel to the inclination of wing 512g when the canister purge valve is opened.

Further, angle 1143 may be greater than angle 1013 formed between wing 512g and central longitudinal axis in FIG. 10. In the present disclosure, angle 1143 may be approximately 65 degrees relative to central longitudinal axis 702. In one example, wing 512g may form a 60° angle relative to central longitudinal axis 702 when the canister purge valve is opened. In another example, wing 512g and line 1147 may form an angle of 70° relative to central longitudinal axis 702 when the canister purge valve is opened. In yet another example, wing 512g (and line 1147) may form an angle of exactly 65° relative to central longitudinal axis 702. Thus, each of the plurality of wings 512 may be at an angle of approximately 65 degrees relative to the central longitudinal axis 702 when the valve body 328 and canister purge valve 112 is opened.

It will be appreciated that each of the plurality of wings 512 may also be inclined at a different angle relative to base 804 of elastomer seal 334 from that in the closed configuration e.g. view 1010. As an example, wing 512g may form an angle 1145 with base 804 or line 1019. Further, angle 1145 may be smaller than angle 1015 of FIG. 10. As explained earlier, line 1019 may indicate an extension of base 804 for improved clarity of the angles formed in the seal assembly. Angle 1145 may be approximately 25 degrees relative to base 804 and line 1019 when the canister purge valve is open. In one example, angle 1145 may be 30° relative to base 804. In another example, angle 1145 may be substantially parallel relative to base 804 (or line 1019) when the canister purge valve is opened. In yet another example, angle 1145 may be exactly 25° relative to base 804. Thus, each of the plurality of wings 512 may form an approximate angle of 25 degrees relative to the base 804 of the elastomer seal 334 when the elastomer seal 334 unblocks aperture 506 in valve seat 516 and canister purge valve 112 is opened.

Plurality of wings 512 may assume a more flattened position in the open configuration of canister purge valve 112 because the plurality of wings 512 may be pushed against a surface of the stator assembly 318. Referring to FIG. 4 and magnified view 600 of FIG. 6, as the stator assembly 318 is energized via flowing electricity through electric coil 312, stator 326 may be magnetized and armature 332 may be lifted towards stator 326. Consequently, elastomer seal 334 may also be drawn towards stator assembly 318. As seal 334 is raised off of valve seat 516, plurality of wings 512 may impinge on a flat surface 612 of stator assembly 318. Surface 612 may be a base of stator assembly 318, in one example. As a result of the impingement against surface 612, each of plurality of wings 512 may be lightly stressed and flexed into a more flattened position relative to their un-stressed and natural position when the stator assembly is de-energized and the valve seat is closed.

It will also be noted that in example views 1010 and 1140, no rotation of the armature-seal assembly 330 is depicted even though the armature-seal assembly 330 may rotate during purge operation, as will be described below in reference to FIG. 12.

Figure 12:
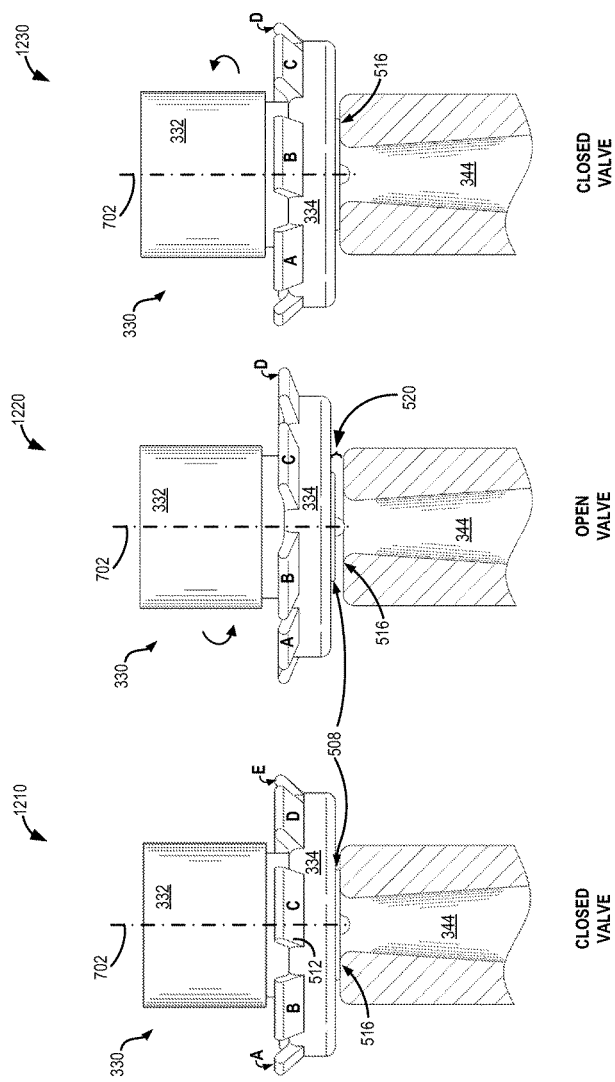
FIG. 12 illustrates rotation of the example armature-seal assembly of FIG. 7, in accordance with the present disclosure.
Figure 13:
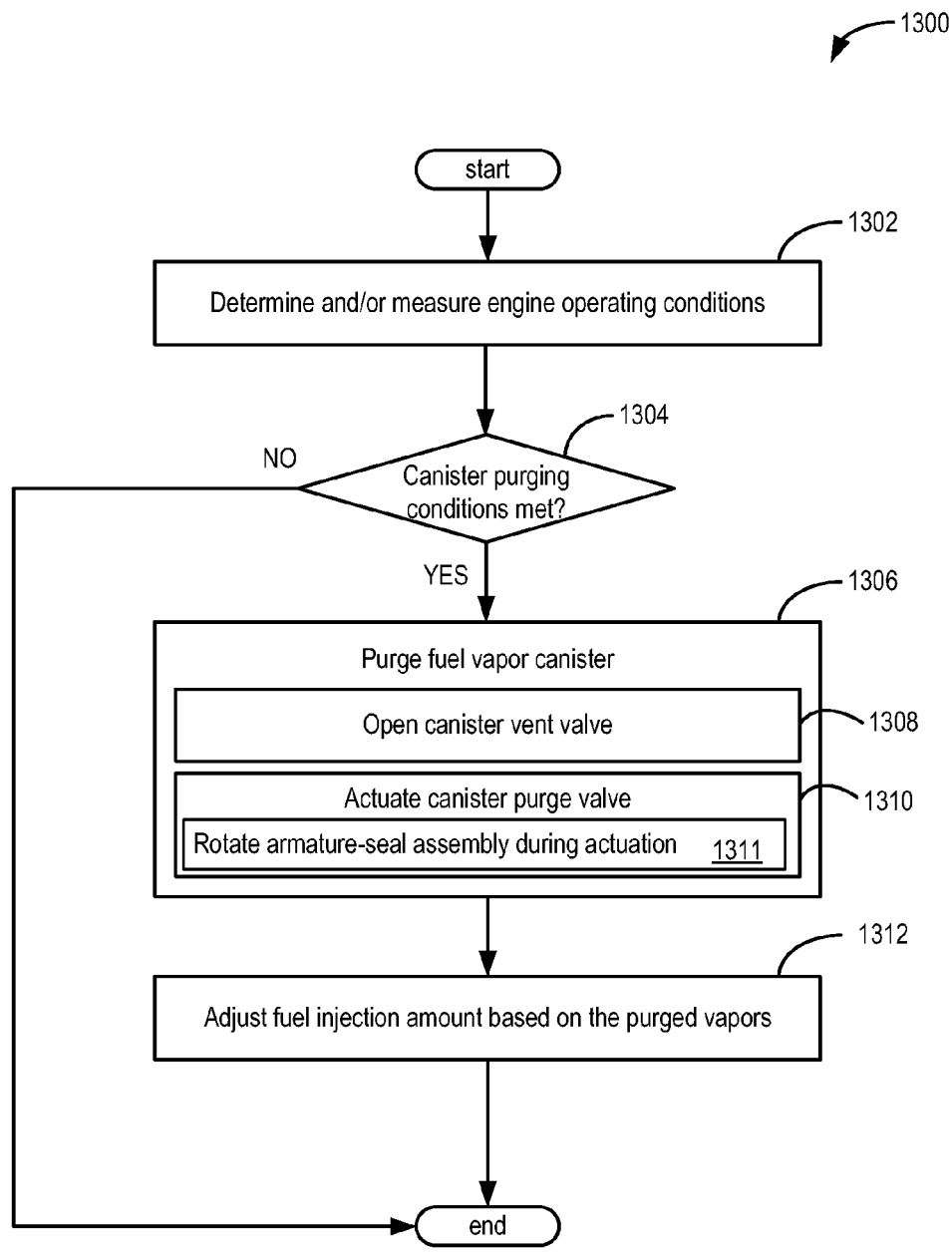
FIG. 13 is an example flowchart depicting a method for purging a fuel vapor canister.

FIG. 12 illustrates a rotation of armature-seal assembly 330 as the canister purge valve is modulated between an open and closed position during a given purge operation. Specifically, a first view 1210 shows a closed configuration of canister purge valve 112, a second view 1220 depicts an open configuration of canister purge valve 112, and third view 1230 illustrates a closed configuration of canister purge valve 112. First view 1210, second view 1220, and third view 1230 may be successive closed-open-closed operations of the canister purge valve. As an example, the position of armature-seal assembly 330 in second view 1220 may immediately follow the position of armature-seal assembly 330 in first view 1210. Further, the position of armature-seal assembly 330 in the third view 1230 may be directly subsequent to the position of armature-seal assembly 330 in the second view 1220.

In another example, first view 1210, second view 1220, and third view 1230 may not depict successive closed-open-closed operations. Thus, the position of armature-seal assembly 330 in the second view 1220 may indicate a position a few cycles after the position of armature-seal assembly 330 in the first view. Similarly, the position of armature-seal assembly 330 in the third view 1230 may occur a few cycles after the position of armature-seal assembly 330 in the second view 1220. However, all of first view 1210, second view 1220, and third view 1230 may occur within the same given purge operation.

As shown in 1210, underside surface 804 of elastomer seal 334 may rest on valve seat 516 substantially occluding aperture 506 to outlet channel 344. In this position, a plurality of wings 512 may be located as shown with wing A being at the extreme left (as viewed by reader) of first view 1210 and wing E being towards the extreme right of first view 1210. At second view 1220, the armature-seal assembly 330 may be lifted up and away from valve seat 516 such that annular lip 508 is no longer in contact with valve seat 516. Further, gap 520 may be formed between underside surface 804 of elastomer seal and valve seat 516. Furthermore, as depicted in 1220, the armature-seal assembly 330 may have rotated in an anti-clockwise direction. To elaborate, wing A may move from left hand side of second view 1220 (and of reader) towards right hand side of second view 1220 (and of reader). Similarly, wings B, C, and D may shift towards the right of second view 1220 and wing E may be blocked from view by wing D as wing E moves away from the reader towards the back of armature 332. As such, with each actuation of the valve, the seal-armature assembly may be ratcheted to rotate the armature about its central longitudinal axis 702.

At third view 1230, the valve may be in a closed configuration again with seal 334 of armature-seal assembly 330 resting on valve seat 516. It will be noted herein that the plurality of wings 512 have rotated further in the anti-clockwise direction such that wing D is not entirely visible, and wings A, B, and C have moved further to the right hand side of third view 1230 (and of reader).

It will be appreciated that while in the example of FIG. 12, an anti-clockwise rotation around central longitudinal axis 702 is depicted, rotation of the armature-seal assembly 330 during a purge operation may be clockwise, or even a combination of both clockwise and counter-clockwise directions.

The rotation of the armature-seal assembly 330 may be due to the variation in positions of the wings as the valve is opened and closed. As described earlier, plurality of wings 512 may be in an un-stressed inclined position when the valve is closed. As the valve is opened, the plurality of wings 512 may be pushed up against the stator assembly 318. The rotation of armature-seal assembly 330 may also occur due to the plurality of angled wings wherein each wing may have a first side (712) and a second side (714) that are formed at differing angles. Alternatively, the rotation of the armature-seal assembly 330 may also be enabled by the flow of desorbed carbon vapors across the plurality of angled wings during the purge operation.

As such, by rotating the armature 332 around its central longitudinal axis 702, seal 334 may not be pulsed in the same location on valve seat 516 during a purge operation. If pulsed at the same location, trapped contaminants may remain attached to the seal surface. Due to the ratcheting of the armature (and seal) at each actuation, trapped contaminant particles may be dislodged and moved such that they may be drawn towards valve seat 516 and therethrough into outlet channel 344. In this way, trapped contaminants may be displaced from the seal surface and may be expelled into the engine intake.

Turning now to FIG. 13, an example routine 1300 is described for purging a fuel vapor canister such as canister 22 of FIGS. 1 and 2 included in a fuel system such as fuel system 40 of FIG. 2 in vehicle propulsion system 100 of FIG. 1. During purging conditions, fuel vapors stored in the fuel vapor canister may be delivered to an engine intake manifold via a canister purge valve. A pulse width modulated signal may be communicated to canister purge valve 112 by controller 12. The method of FIG. 13 may be stored as executable instructions in non-transitory memory of controller 12 shown in FIG. 1.

At 1302, the routine may include determining operating conditions. Operating conditions may include ambient conditions, such as temperature, humidity, and barometric pressure, as well as vehicle conditions, such as engine operating status, fuel level, MAF, MAP, etc. For example, it may be determined if vehicle propulsion system 100 is operating with engine-on or engine-off conditions. As an example, it may be determined if the vehicle is being propelled using motor torque from a system motor and/or energy storage device, using engine torque from a combustion engine of the system, or a combination of motor torque and engine torque. Upon determining operating conditions, the routine may proceed to 1304.

At 1304, routine 1300 may confirm that canister purging conditions are met. Purging conditions may be determined based on various engine and vehicle operating parameters, including an engine-on condition, an amount of hydrocarbons stored in fuel vapor canister 22 being greater than a threshold amount, the temperature of emission control device 70 being greater than a threshold temperature, a temperature of fuel vapor canister 22, fuel temperature, the number of engine starts since the last purge operation (such as the number of starts being greater than a threshold), a duration elapsed since the last purge operation, fuel properties, and various other conditions.

If purging conditions are met, routine 1300 may proceed to 1306. At 1306, the canister may be purged to deliver a mixture of fuel vapor and air from the fuel vapor canister to the intake manifold. Purging the canister may include, at 1308, opening canister vent valve 114 (FIG. 2) and may further include at 1310, pulsing canister purge valve 112 to purge fuel vapors stored in the canister into the intake manifold. As such, during purging, atmospheric air may be drawn in through the canister vent valve. The atmospheric air may be utilized to purge the canister of fuel vapors. The purged fuel vapor and air mixture may be delivered to the intake manifold via the canister purge valve. For example, the controller may deliver a pulse-width modulated signal to the canister purge valve in order to open the purge valve for a desired duration. The desired duration may be based on a desired volume of purge, and a purge fuel flow rate. Further, at 1311, during purging, the canister purge valve may be rotated. Each actuation of the canister purge valve may include a gradual ratcheting of the armature-seal assembly 330, as described earlier. If purging conditions are not confirmed at 1304, the routine may end.

At 1312, routine 1300 may include adjusting a fuel injection amount based on an amount of fuel vapors received in the engine intake. Specifically, an amount of fuel injected into the engine cylinders is adjusted based on the quantity of fuel vapors received from the fuel vapor canister. For example, fueling via injectors may be decreased as purged fuel vapor concentration increases so as to maintain combustion at stoichiometry. Fuel vapor concentration may be learned from exhaust gas sensor 126.

In this way, during purging conditions, fuel vapor and air mixture from the canister may be delivered to the intake manifold via the canister purge valve. During the purge operation, the armature 332 and seal 334 may experience rotation with each opening and closing of the valve seat 516. The rotation may be due to the plurality of angled wings on the circumference of seal 334, the flattening and un-flattening of the plurality of angled wings, and/or the flow of purged fuel vapors across the plurality of wings.

Figure 14:
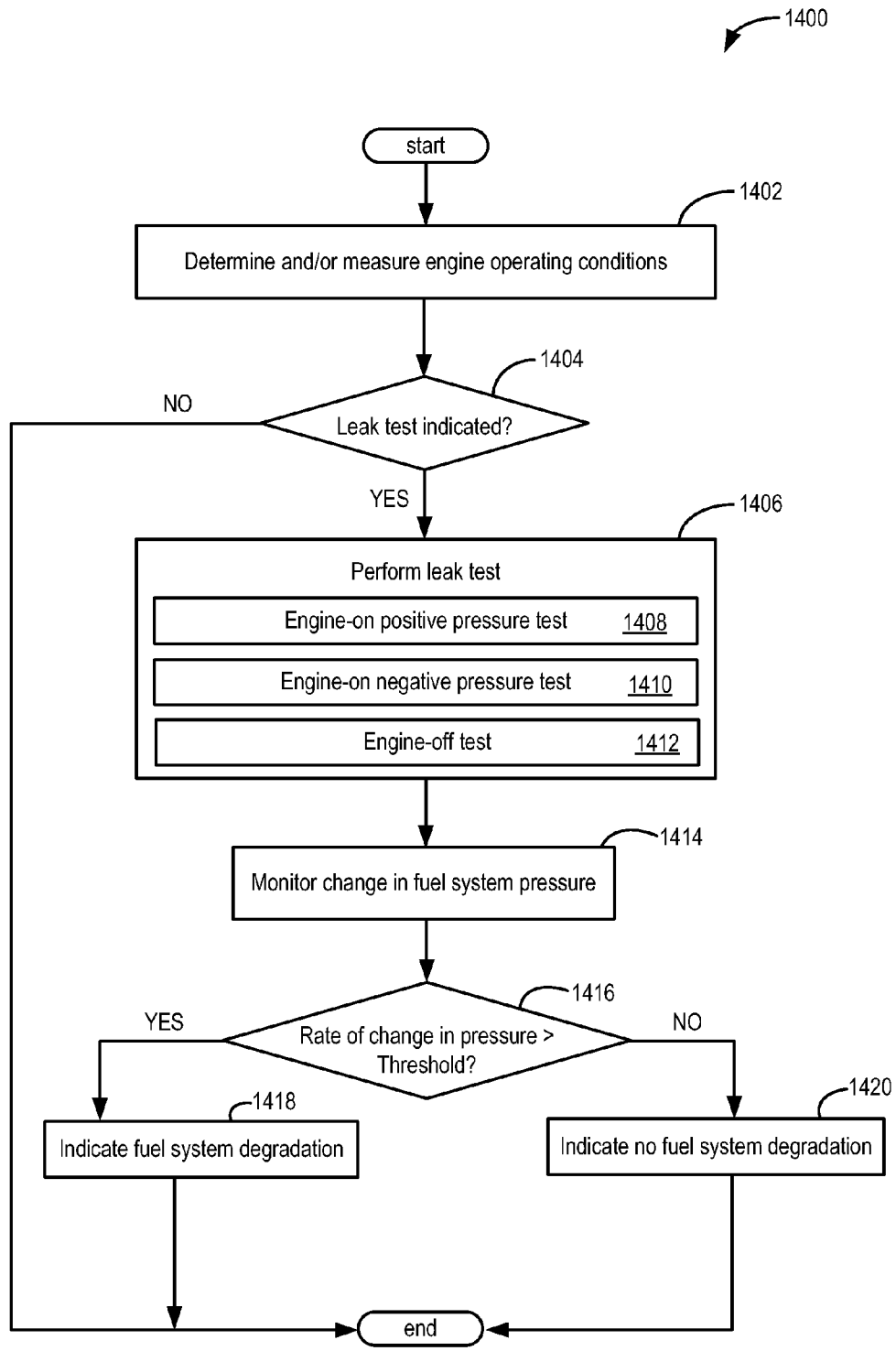
FIG. 14 portrays an example flowchart illustrating a method for diagnosing leaks in the fuel system.

Turning now to FIG. 14, it depicts routine 1400 for performing a diagnostic leak test on an evaporative emission control (EVAP) system in a vehicle, such as vehicle propulsion system 100 of FIG. 1. Controller 12 may also be configured to intermittently perform leak detection routines on fuel system 40 to confirm that the fuel system is not degraded. As explained earlier, contaminants trapped between seal 334 and valve 516 may result in leaks through the EVAP system and diagnostic routines may detect these leaks. As such, by enabling a rotation of the armature-seal assembly within the canister purge valve, trapped contaminants may be dislodged and purged into an engine intake along with desorbed fuel vapors.

At 1402, routine 1400 includes determining engine operating parameters. The engine operating parameters may include engine speed, load, fueling conditions (e.g., amount of fuel in fuel tank, whether the fuel system is in a purge mode, etc.), and time since a previous leak detection test was performed. At 1404, it may be determined if a leak test is indicated. The leak test may be performed periodically, such as every 100 miles driven. Further, the leak test may be performed only under certain conditions. For example, the leak test may only be performed if the engine temperature is below a threshold, if the fuel system is in standard, non-purge mode, etc. If the leak test is not indicated, routine 1400 ends.

If the leak test is indicated, for example if a threshold amount of time or distance traveled by the vehicle has elapsed since a previous test was performed, routine 1400 proceeds to 1406 to perform the leak test. As such, leak detection routines may be performed while the engine is off (engine-off leak test) or while the engine is running. At 1408, an engine-on leak test may include applying a positive pressure on the fuel system for a duration (e.g., until a target fuel tank pressure is reached). For example, positive pressure generated at a turbocharger in a boosted engine system may be applied on the fuel system. A second option, at 1410, may include an engine-on leak test by applying a negative pressure on the fuel system for a duration (e.g., until a target fuel tank vacuum is reached). Herein, negative pressure generated downstream of an intake throttle in an engine intake may be applied on the fuel system. In some embodiments, the leak test may be performed only when the engine is off, to reduce testing noise resulting from excess engine heat, fuel sloshing, etc. Thus, at 1412, an engine-off leak test may be performed, for example, with a vacuum pump that may be driven by an electric motor (e.g., motor 20). Herein, the vacuum pump may apply a pressure on the fuel system when the engine is not operational.

In each of the above options, after application of pressure on the fuel system, the fuel system may be sealed while a change in fuel system pressure (e.g., a rate of change in the vacuum level, or a final pressure value) is monitored. Accordingly, at 1414, variations in fuel system pressure may be monitored. In one example, the fuel system pressure is a fuel tank pressure estimated by a pressure sensor coupled between the fuel tank and the canister of the fuel system. Monitoring the fuel system pressure may include monitoring a rate of change in the fuel tank pressure and/or monitoring a stabilized fuel tank pressure following the application of the pressure.

As such, following isolation of the fuel system, the fuel system pressure (herein, the fuel tank pressure) may be expected to equilibrate back towards atmospheric pressure at a defined rate (based on a reference orifice size). If a leak is present, the monitored fuel tank pressure may be expected to reach to the atmospheric pressure at a faster rate.

Accordingly a rate of change in the fuel tank pressure following application of the negative pressure may be determined and compared to a threshold rate at 1416. If the rate of fuel system pressure decay is larger than the threshold rate, then, at 1418, fuel system degradation may be determined. Fuel system degradation may be indicated by setting a diagnostic code (e.g., by setting a malfunction indication light). Alternatively, if the rate of change in fuel tank pressure is smaller than the threshold, no fuel system degradation (based on the positive pressure test) may be determined at 1420.

While the depicted example shows fuel system degradation indicated in response to a rate of change in fuel tank pressure being larger than a threshold (following application of either the positive or negative pressure), in other embodiments, the fuel tank pressure may be allowed to stabilize and the stabilized pressure value may be compared to a reference value, such as a value obtained with a reference orifice. Other leak tests may also be performed to determine a presence of leaks in other embodiments.

As explained earlier, detected leaks may be due to contaminants trapped on an underside surface of seal 334 in the armature-seal assembly 330 within canister purge valve 112. Trapped contaminants may not allow complete sealing of the valve seat and small leaks may be detected by diagnostic routines such as the example routine described above. By enabling a rotation of the armature-seal assembly 330 via the plurality of angled wings on the seal circumference, trapped contaminants may be dislodged and removed from the canister purge valve. Thus, likelihood of detecting contaminant-sourced leaks may be decreased, and unnecessary diagnostic tests due to such leaks may be reduced enabling a decrease in maintenance costs.

Thus, an example purge valve assembly may include a valve body with an inlet port and an outlet port and a valve seat disposed in the valve body, wherein the valve seat has an aperture in the path of vapor flow between the inlet port and the outlet port. Further, the purge valve assembly may include a stator assembly including a coil and a stator, the stator being magnetized when the coil is energized, and an armature that moves towards the stator away from the valve seat when the coil is energized, and moves away from the stator and towards the valve seat when the coil is de-energized. An elastomer seal formed with a plurality of wings may be attached to a first end of the armature that rotates the armature as the stator assembly is modulated from being energized to de-energized and vice versa. The plurality of wings on the elastomer seal may be pushed against a surface of the stator assembly when the coil is energized and the valve seat is opened.

The elastomer seal may engage the valve seat when the coil is de-energized and may occlude the aperture in the valve seat to close the purge valve. Further, the elastomer seal may unblock the aperture in the valve seat when the coil is energized to open the purge valve. Each of the plurality of wings may be inclined at an angle of approximately 50 degrees relative to the base of the elastomer seal when the elastomer seal engages the valve seat and the purge valve is closed. The plurality of wings may be in a non-stressed condition when the purge valve is closed.

Furthermore, the plurality of wings may be stressed and flattened when the coil is energized to open the purge valve such that each of the plurality of wings forms an approximate angle of 25 degrees relative to the base of the elastomer seal when the elastomer seal unblocks the aperture in the valve seat. The plurality of wings on the elastomer seal may thus vary between a stressed position and a substantially non-stressed position as the stator assembly is energized and de-energized respectively. As explained earlier, the elastomer seal may substantially surround the first end of the armature. Further still, the plurality of wings may be formed around a circumference of the elastomer seal such that they protrude radially outward from the circumference of the elastomer seal.

In another example, a method for a canister purge valve may comprise rotating an armature within a valve body as the canister purge valve opens and closes during a purge operation, the armature encircled at a first end by an elastomer seal with multiple angled wings. The multiple angled wings may be positioned projecting radially outward along a circumference of the elastomer seal. Further, each of the multiple angled wings may include a first side surface and a second side surface, wherein the first side surface is approximately perpendicular relative to the circumference of the elastomer seal and the second side surface is not perpendicular to circumference of the elastomer seal.

In yet another example, a method for operating a canister purge valve, having a valve body including an armature engaging and disengaging with the valve body, may comprise opening and closing the valve body via the armature to selectively enable purge flow, and ratcheting the armature with each actuation of the valve body to rotate the armature about a central longitudinal axis. A first end of the armature may be surrounded by an elastomer seal wherein the elastomer seal may have a plurality of wings enabling the ratcheting of the armature. The plurality of wings may be arranged in a radial manner around a circumference of the elastomer seal. Further, each of the plurality of wings may include a first side and a second side, the first side projecting outwardly in a radial direction relative to the circumference and the second side not projecting in a radial direction relative to the circumference.

Each of the plurality of wings may be approximately at an angle of 40 degrees relative to the central longitudinal axis when the valve body is closed. Further, the plurality of wings may be in a non-stressed condition when the valve body is closed. As such the plurality of wings may impinge against a flat surface of a stator assembly when the valve body is opened and may be stressed and flattened when canister purge valve is opened. Each of the plurality of wings may be at an angle of approximately 65 degrees relative to the central longitudinal axis when the valve body is opened. The elastomer seal surrounding the first end of the armature may substantially block an outlet (aperture) of the purge valve when the valve body is closed, and the elastomer seal may substantially unblock the outlet (also termed, aperture) of the purge valve when the valve body is opened.

In this way, an armature may be rotated around its central longitudinal axis by the action of a plurality of angled wings around a circumference of a seal attached to a first end of the armature. The action of the plurality of angled wings may include variations between an un-stressed, inclined position, and a stressed, flexed, and flattened position. Flow of desorbed vapors past the seal may enable further rotation. By ratcheting the armature-seal assembly, contaminants trapped on an underside of the seal may be dislodged such that the contaminants are released into the purge path. By dislodging trapped contaminants, the seal around the armature may engage fully with the valve seat when the canister purge valve is closed. Consequently, leaks due to contaminant trapping may be reduced. Further, the decrease in detection of such contaminant-sourced leaks may enable a reduction in unnecessary diagnostics. Further still, a more accurate estimate and control of vapor purge flow may be obtained.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a purge valve coupled to a fuel vapor canister, having a valve body including an armature engaging and disengaging with the valve body, comprising:
    opening and closing the valve body via the armature to selectively enable purge flow during a purge operation of the fuel vapor canister; and
    ratcheting the armature with each actuation of the valve body to rotate the armature about a central longitudinal axis, where a first end of the armature is surrounded by an elastomer seal, the elastomer seal having a plurality of wings enabling the ratcheting of the armature.

2. The method of claim 1, wherein the plurality of wings is arranged in a radial manner around a circumference of the elastomer seal.

3. The method of claim 2, wherein each of the plurality of wings includes a first side and a second side, the first side projecting outwardly in a radial direction relative to the circumference.

4. The method of claim 3, wherein each of the plurality of wings is approximately at an angle of 40 degrees relative to the central longitudinal axis when the valve body is closed, and wherein the plurality of wings is in a non-stressed condition when the valve body is closed.

5. The method of claim 4, wherein the plurality of wings impinges against a flat surface of a stator assembly and is stressed and flattened when the valve body is opened.

6. The method of claim 5, wherein each of the plurality of wings is at an angle of approximately 65 degrees relative to the central longitudinal axis when the valve body is opened.

7. The method of claim 6, wherein the elastomer seal surrounding the first end of the armature substantially blocks an outlet of the purge valve when the valve body is closed, and wherein the elastomer seal substantially unblocks the outlet of the purge valve when the valve body is opened.

8. The method of claim 7, wherein stored fuel vapors from the fuel vapor canister are released into an intake of an engine when the valve body in the purge valve is opened, and wherein an amount of fuel injected into the engine is adjusted based on an amount of the stored fuel vapors received in the intake.

9. A method for a canister purge valve comprising rotating an armature within a valve body as the canister purge valve opens and closes during a canister purge operation, the armature encircled at a first end by an elastomer seal with multiple angled wings.

10. The method of claim 9, wherein the multiple angled wings are positioned projecting radially outward along a circumference of the elastomer seal.

11. The method of claim 10, wherein each of the multiple angled wings includes a first side surface and a second side surface, and wherein the first side surface is approximately perpendicular relative to the circumference of the elastomer seal and the second side surface is not perpendicular to the circumference of the elastomer seal.

12. A purge valve assembly, comprising:
    a valve body with an inlet port and an outlet port;
    a valve seat disposed in the valve body, wherein the valve seat has an aperture in a path of vapor flow between the inlet port and the outlet port;
    a stator assembly including a coil and a stator, the stator being magnetized when the coil is energized;

an armature that moves towards the stator away from the valve seat when the coil is energized, and moves away from the stator and towards the valve seat when the coil is de-energized; and an elastomer seal formed with a plurality of wings attached to a first end of the armature that rotates the armature as the stator assembly is modulated from being energized to de-energized and vice versa, the plurality of wings on the elastomer seal being pushed against a surface of the stator assembly when the coil is energized and the valve seat is opened.

13. The purge valve assembly of claim 12, wherein the elastomer seal engages the valve seat when the coil is de-energized and occludes the aperture in the valve seat to close a purge valve, and wherein the elastomer seal unblocks the aperture in the valve seat when the coil is energized to open the purge valve.

14. The purge valve assembly of claim 13, wherein each of the plurality of wings is inclined at an angle of approximately 50 degrees relative to a base of the elastomer seal when the elastomer seal engages the valve seat and the purge valve is closed.

15. The purge valve assembly of claim 14, wherein the plurality of wings is stressed and flattened when the coil is energized to open the purge valve such that each of the plurality of wings forms an approximate angle of 25 degrees relative to the base of the elastomer seal when the elastomer seal unblocks the aperture in the valve seat.

16. The purge valve assembly of claim 15, wherein the plurality of wings is in a non-stressed condition when the purge valve is closed.

17. The purge valve assembly of claim 16, wherein the plurality of wings on the elastomer seal varies between a stressed position and a substantially non-stressed position as the stator assembly is energized and de-energized respectively.

18. The purge valve assembly of claim 12, wherein the elastomer seal substantially surrounds the first end of the armature.

19. The purge valve assembly of claim 18, wherein the plurality of wings is formed around a circumference of the elastomer seal, the plurality of wings protruding radially outward from the circumference of the elastomer seal.

* * * * *